F. J. SCHLINK.
WEIGHING SCALE.
APPLICATION FILED JULY 22, 1916.
1,218,902.
Patented Mar. 13, 1917.
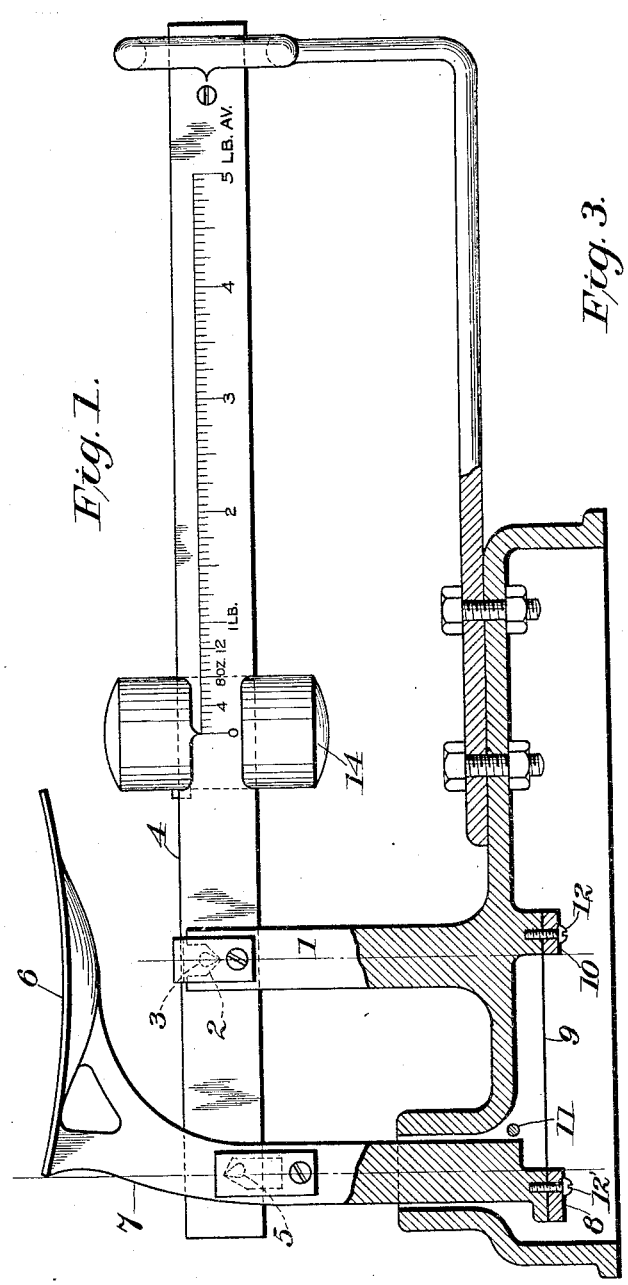
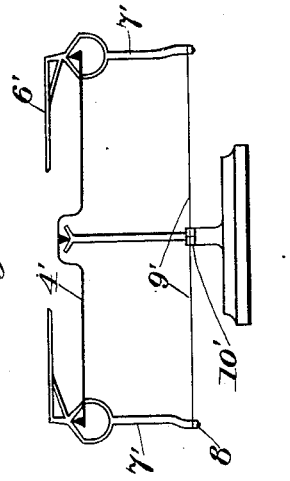
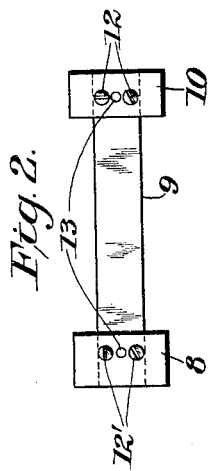
Inventor
Frederick J. Schlink

UNITED STATES PATENT OFFICE.

FREDERICK J. SCHLINK, OF WASHINGTON, DISTRICT OF COLUMBIA.

WEIGHING-SCALE.

1,218,902.  Specification of Letters Patent.  Patented Mar. 13, 1917.

Application filed July 22, 1916. Serial No. 110,804.

*To all whom it may concern:*

Be it known that I, FREDERICK J. SCHLINK, a citizen of the United States, and an employee of the Bureau of Standards, United States Department of Commerce, a legal resident of the State of Illinois, residing in the city of Washington, in the District of Columbia, (whose post-office address is 1425 T street, NW.,) have invented new and useful Improvements in Weighing-Scales, and have made application by petition of even date herewith, under the act of March 3, 1883, chapter 143, (22 Stat., 625,) praying that Letters Patent therefor may be granted to me.

The invention herein described and claimed may be used by the Government of the United States or by any of its officers or employees in the prosecution of work for the United States, or by any person in the United States, without payment of any royalty thereon.

The following is the specification of the invention:

My invention relates to an improvement in stabilizing devices for weighing scales.

The object of my invention is to provide a stabilizing mechanism for a scale pan or platform sensibly free from friction and not subject to the relative large and variable frictional resistances which occur in scales equipped with the usual forms of stabilizing devices.

The stabilized scale is usually distinguished by having a platform or pan located above the knife edges in the weighing beam or lever, and the mechanism for stabilizing said pan and constraining it to move in parallel planes is called the stabilizing mechanism. In the ordinary forms which are familiar in the numerous postal and package scales of small and moderate capacity the stabilizing link or element is a simple flat bar provided at each end with holes through which respectively pass pins connecting the bar at one end to a fixed part of the scale and at the other to the vertical stem supporting the platform. The length of this link between centers of pin holes, in order that the weight indicated shall be independent of the position of the load on the platform, is required to be equal to the distance between the load and the fulcrum knife edges of the beam. The pins at either end of the link form pivots. When the load on the platform is displaced from the center of said platform in the direction of the longitudinal axis of the beam, a stress is set up in the stabilizing link accompanied by reactions at each of the pivots above mentioned, and for all such non-central placement of the load a considerable and variable friction will be introduced at these connections, this friction being much greater in amount than that existing between the usual knife edge and bearing, thus acting to reduce the accuracy of the scale, and to limit the sensitiveness which is attainable under the given construction. My invention relates to a means of overcoming this difficulty by providing a stabilizing element which is sensibly free from friction and which leaves the scale unaffected as to accuracy and sensitiveness by variation in the position of the load upon the platform.

The nature, characteristic features, and scope of my invention will be more readily understood by the following description taken in connection with the accompanying drawing.

In the drawings: Figure 1 is an elevation in partial section of a typical postal scale embodying my invention. Fig. 2 is a view from below of the elastic tape used as the stabilizing element, in connection with the clamp at each end thereof, by means of which the tape is secured. Fig. 3 illustrates schematically the application of my invention to the so-called "trip scale" or equal-arm stabilized pan balance such as is in common use in trade.

Referring more particularly to the drawing: 1 indicates the post which supports the fulcrum bearing 2 in which the fulcrum knife edge 3 of the beam 4 is pivoted. The beam carries a sliding poise 14 and the usual scale of graduations. The load knife edge is shown at 5 and may if necessary be somewhat inclined in a direction away from the scale platform 6, the latter being carried on a supporting stem 7, which at its lower end receives by a suitable clamp member 8 one end of the tape (or wire) 9. The clamp member 8 is secured to the stem by means of the screws 12'. The other end of the tape is received beneath the clamp member 10 which is secured to the base of the scale by means of the screws 12. The pan or platform 6 is so located as to lie entirely to the one side, namely, that nearest the fulcrum knife edge, of the load knife edge 5. It thus results that tensile stresses only are produced in the tape 9 for all positions of the load on the platform. The distance between the proximate faces of the clamp members 10 and 8 is substantially equal to the distance between the contact lines of the fulcrum knife edge 3 and the load knife edge 5 while the distance between the contact line of the fulcrum knife edge 3 and the line of entry of the tape beneath the clamp member 10 is equal to the distance between the line of contact of the load knife edge 5 and the line of entry of the tape beneath the clamp member 8. A pin may be provided as at 11 to prevent buckling of the tape, in case, by accident or from any other cause, the lower portion of the stem supporting the pan should be displaced toward the member 10.

Suitable means may be added for permanently securing the tape after adjustment so that it may not be subject to the danger of displacement through accident or shock. In Fig. 2 the screws by which clamp members 8 and 10 are held in position may pass through close-fitting holes in the tape or may act to secure the tape ends by friction between the clamp jaws alone. The pins 13 may after final adjustment of the tape be driven tightly into holes drilled completely through clamp jaws and tape so as to provide a positive, and not easily alterable, means of preventing slippage or displacement of the tape during use of the scale.

The thickness and width of the tape are chosen so as to be suitable to the loads and service the scale will be subjected to. I do not wish to be limited to the use of a single tape for the purpose.

It is to be noted that some elastic effect will be introduced by the stiffness of the tape, especially if the tape be made relatively thick in order to withstand large loads, but no difficulty will be experienced on this account as the additional restoring moment provided by the elasticity of the tape can be compensated for by suitable reduction of the restoring moment of the beam, by adjusting its center of gravity close to or even, if it should in rare instances prove necessary, by locating it above the fulcrum knife edge.

In Fig. 3 in which an equal-arm balance is shown, 4' is the scale beam having the load knife edges at either end, each of which support the stem 7', a tape 9' being connected to the lower end of each stem.

It is understood that it is not essential that the stabilizing tape be below the plane of the beam. The arrangement may be such that the stabilizing tape is above the plane of the beam or in fact in any plane except that defined by the load and fulcrum knife edges. In case the stabilizing tape lies above the plane of the load and fulcrum knife edges, the particular side toward which the scale platform is disposed may differ from the arrangement illustrated in the drawings. In any case the disposition of the platform will be such that the stress introduced in the tape will be in the sense of tension.

Although but two specific embodiments of this invention have been herein shown and described, it will be understood that numerous details of the construction shown may be altered or omitted without departing from the spirit of this invention as defined by the following claim:

In a weighing scale, the combination with the scale beam of a load supporting member pivotally connected to the beam at one side of the fulcrum of the beam, said member having its load receiving platform so disposed with reference to said pivot that the center of gravity of the system including the said member and the load placed upon its load receiver will always lie on a given side of the vertical plane through the pivot axis, said member extending away from the plane of said load pivot and fulcrum and a flexible tape so connected at one end to said member at a point outside the plane of said pivots and at the other end to a stationary part of the scale as to afford a free portion of the tape between the points of connection substantially equal in length to and, under tension parallel with, a straight line terminating in the axes of the above-named pivot and fulcrum and perpendicular to such axes.

Signed at Washington, D. C., this 21st day of July, 1916.

FREDERICK J. SCHLINK.

Witnesses:
C. A. BRIGGS,
LOUIS A. FISCHER.

Copies of this patent may be obtained for five cents each, by addressing the "Commissioner of Patents, Washington, D. C."